Aug. 21, 1962 J. I. HELLER 3,050,595

POCKET TAPE RECORDERS

Filed Feb. 27, 1958 4 Sheets-Sheet 1

INVENTOR.
JOSEPH I. HELLER
BY R. K. Bumstead
ATTORNEY

Aug. 21, 1962 J. I. HELLER 3,050,595

POCKET TAPE RECORDERS

Filed Feb. 27, 1958 4 Sheets-Sheet 2

INVENTOR.
JOSEPH I. HELLER
BY R. W. Bunstead
ATTORNEY

Aug. 21, 1962 J. I. HELLER 3,050,595

POCKET TAPE RECORDERS

Filed Feb. 27, 1958 4 Sheets-Sheet 3

INVENTOR.
JOSEPH I. HELLER
BY R. W. Bumstead
ATTORNEY

INVENTOR.
JOSEPH I. HELLER
BY R. K. Bumstead
ATTORNEY

United States Patent Office 3,050,595
Patented Aug. 21, 1962

3,050,595

POCKET TAPE RECORDERS

Joseph I. Heller, 321 Atlantic Ave., Brooklyn, N.Y.

Filed Feb. 27, 1958, Ser. No. 717,877
18 Claims. (Cl. 179—100.2)

This invention relates to a so-called pocket tape recorder. It is of a type wherein the recording tape is relatively wide and is formed into a continuous loop to be supported on two drums or rollers. A motor and reducing gear are contained within one of these drums. The other drum contains an electronic amplifier and drives a lead-screw for advancing the recording head laterally of the tape, so as to form a spiral recording track thereon. The tape itself is constituted as a belt by which said "other" drum is driven from the drum which contains the motor. The construction of this recorder has many novel features, as will be brought out in the statement of objects of the invention and in the claims.

It is a primary object of my invention to provide a tape recorder of compact and light-weight construction; one that lends itself to ease of operation, maintenance and control, and is readily adapted for use as a dictating machine wherever such use may be desired. The looped recording medium is found to be foldable without injury to the record. It may, therefore, be mailed to an office by a traveling man for transcription by his stenographer when received.

A second object is to arrange the construction of such a recorder so as to provide the recording medium with an added function, namely to make it serve as a belt for transmitting power from a driving drum to a driven drum.

A third object is to provide a gate for removal of the tape loop whenever it is to be replaced. This gate is formed as a sort of trapeze, having a cross-bar which, in operation, applies tension to the tape loop, and when swung away from the loop this gate frees the latter so as to be removable laterally from one side of the machine.

A fourth object is to provide a worm-driven recording and play-back head mounting such as to enable accurate tracking of a recording path, and to facilitate set-back for listening or the making of corrections.

A fifth object is to provide a novel form of shielding between the motor, the amplier and the record/play-back head, sometimes called a transducing head. This is accomplished by means of the metallic construction of the drums, since these drums surround the motor and the amplifier respectively.

A sixth object is to suitably orient the magnetic axis of the motor field so that its lines of magnetic force will have the least possible disturbing effects upon the amplifier and the transcription on the recording medium.

A seventh object is to gain economy of space by mounting the battery inside the tape loop and between the rollers.

An eighth object is to minimize the injection of noise into the recording. This object is attained at least in part by fixedly positioning the field of the motor after adjustment of its orientation with respect to other electrical components of the system.

A ninth object is to provide for back-spacing of the transducing head with respect to the tape record track without reversing the tape, and virtually without stopping the motor.

A tenth object is to provide a tracking control mechanism whereby the transducing head can be accurately centered with respect to a previously recorded track. This is accomplished by axial adjustment of the bearings in which the lead-screw turns.

An eleventh object is to provide a common mounting support for the transducing head and the erase-head, this mounting being suitably designed to maintain close contact between the two heads and the surface of the tape.

A twelfth object is to provide optionally alternative recording methods of practicing my invention. That is to say, embossed recording may be substituted for magnetic recording if desired. The engraved recording method may also be substituted.

In addition to the features of novelty that are implied by the statement of objects it is pointed out that the main frame on which the drums are mounted, as well as the gate of so-called trapeze formation, is mechanically so coupled to the outer casing as to facilitate removal and replacement of the endless tape.

Another feature of novelty relates to the whipple-tree suspension of the read/record-head and the erase-head so that their magnetic gaps shall make contact with the tape radially with respect to the center of the driven roller, the latter being also constituted as a platen to back the tape against the two heads, but on different radii.

Still another feature of novelty relates to the construction of the motor drive and reducing gear mechanism. The motor frame has a permanent-magnet field fixedly supported on a stationary spindle which is also an axle for the driving drum.

My invention will now be described in full detail, reference being made to the accompanying drawings wherein—

FIG. 8 is an enlarged diagrammatic showing of the structural relationship between the driven roller, the erase-head and the transducing head, the latter being here labeled an R/R head because it has a dual function, namely to Read and to Record.

FIG. 9 shows a basic circuit arrangement having a three-position switch for alternative recording, play-back and battery turn-off, while

Figure 1:
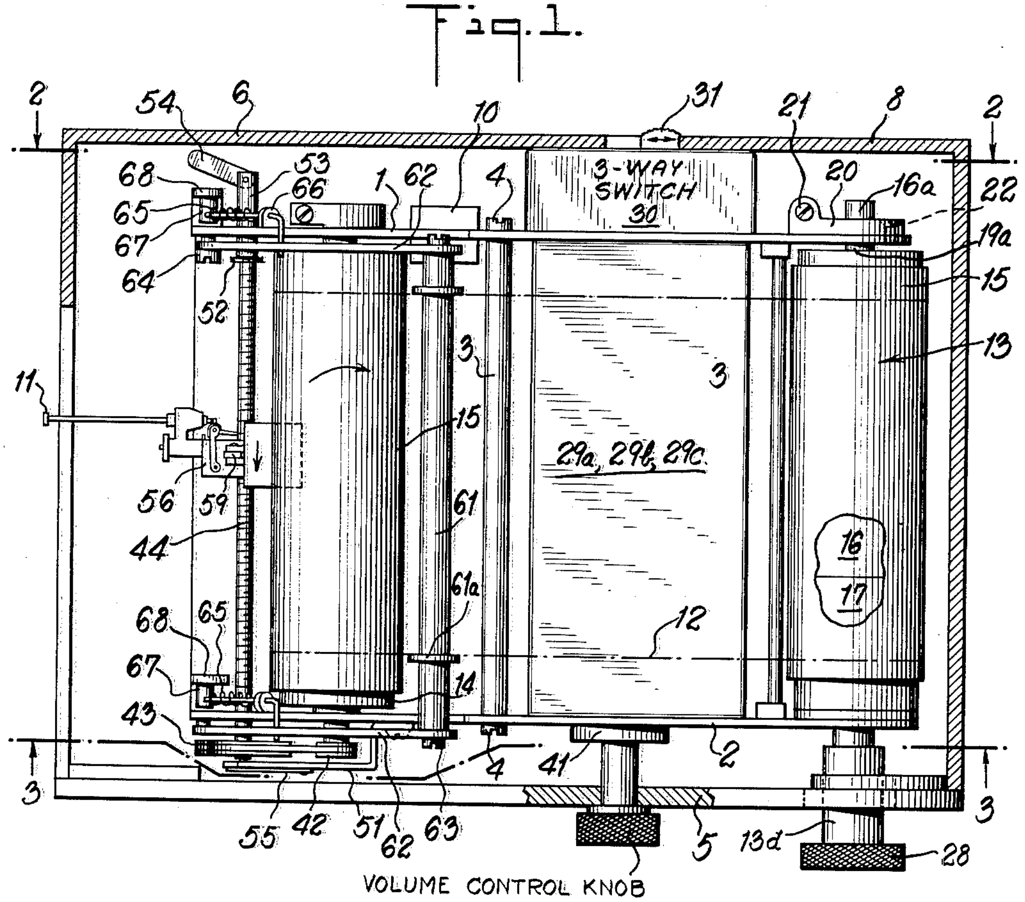
FIGURE 1 is a plan view of the record/play-back instrument, the case being sectioned so as to expose rollers or drums for supporting a wide loop of recording tape.

The working parts of my recorder are principally supported by two side-plates 1 and 2 which are fastened together by spacing rods 3 and holding screws 4. The unit so supported is assembled with an edge-wall 5 of the casing. Another portion of the casing is constituted as a hood 6 which has two flat sides 7 opposing one another, an edge-wall 8, and two semi-cylindrical endwalls 9. Latching means, not shown, are provided for holding together the two portions 5 and 6 of the casing. One or more bosses or cradles 10 attached to the inner wall of the hood member 6 serve to maintain suitable clearance between the casing and the tape loop. The member 10 stabilizes the position of the operating assembly within the casing. In order to uncover the working parts for replacement of the recording tape loop the hood 6 is lifted up from the side member 5, as shown in FIG. 1. The left-hand end portion 9 is slotted so as to permit free removal despite the projection of an adjusting key 11 through this slot.

The endless tape loop 12 is supported by a driving drum 13 and a driven drum 14. These drums are preferably made of aluminum, but they also have a covering of mu-metal sleeves 15 which serve to shield the tape from electro-magnetic interference within the drums. Alternatively, the inner walls of the drum may be lined with this mu-metal.

The driving drum 13 surrounds the motor 16 and is geared to the latter by means of a reducing gear 17 (FIG. 5) of conventional design. A speed governor 18 is provided to compensate for variations of battery voltage. The assembly of motor, reducing gear and the surrounding drum is supported on a hollow stationary shaft 16*a*, at one end, and in bearings 19 and other concentric parts at the other end.

For the sake of convenient assembling of the motor 16 and reducing gear 17 within the driving drum 13, this drum may, if desired, be composed of three pieces, 13*a*, 13*b* and 13*c*, where 13*a* is the pulley by which the tape 12 is driven as a belt. Pieces 13*b* and 13*c* are cup-like end portions, or flanges. The outer shell of the motor 16 has a stem 16*a* at one end, which is affixed to a split anchoring member 20, the latter having a binding screw 21 and being attached to the side-plate 1 by means of a screw 22. This construction enables the field of the motor to be fixedly held against turning, because the field is secured to the outer frame of the motor. It is essential that the magnetic axis of the field should be so oriented with respect to the opposing planes of the tape loop between the drums as to minimize any possible resultant weakening of the magnetic recording. The shaft 16*a* is made hollow in order to admit a pair of conductors 23 for running the motor 16.

Figures 3, 4, 5, 6, 7:
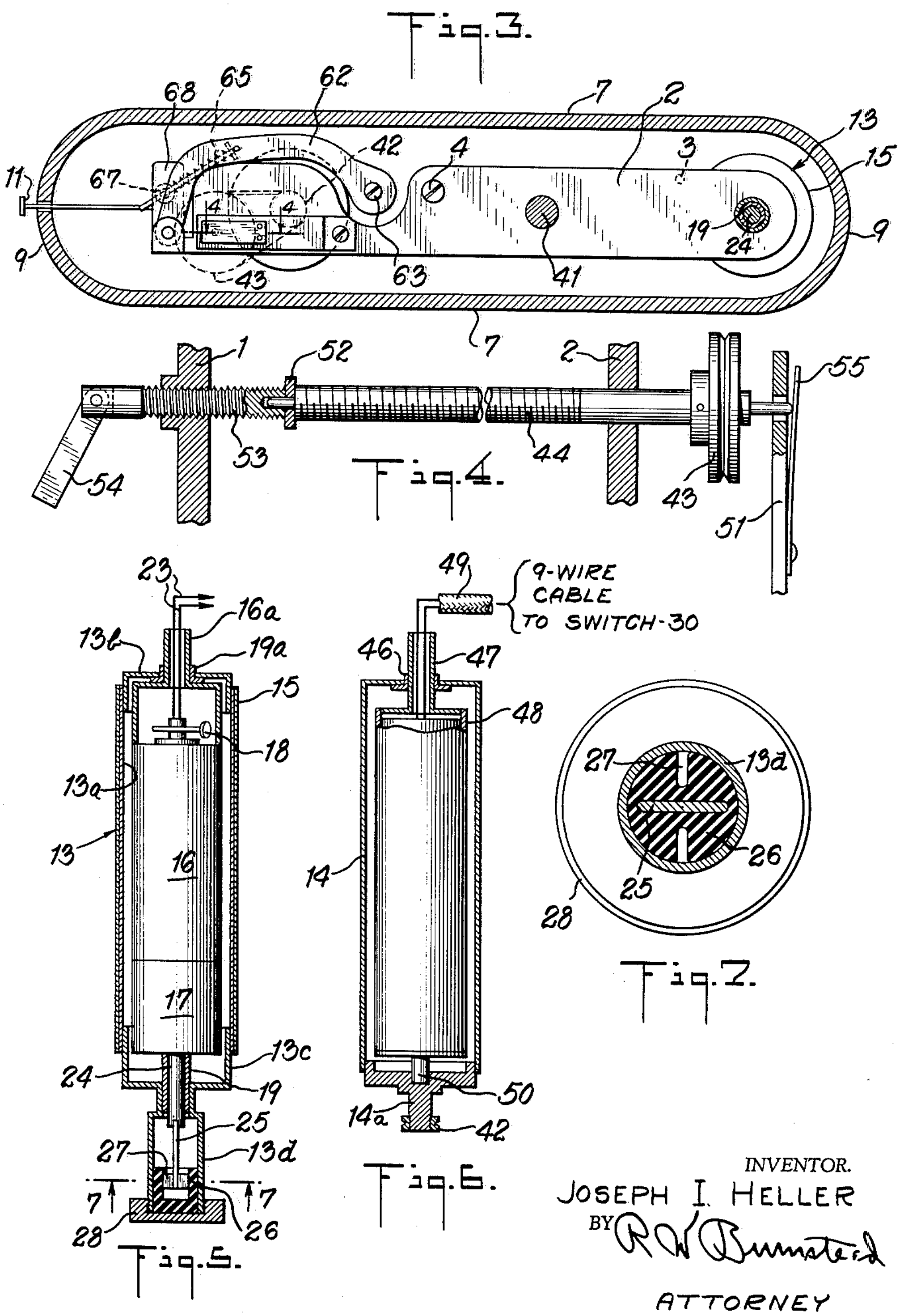
FIG. 3 is another sectional view at the plane 3—3 across FIG. 1.
FIG. 4 shows the lead-screw on which the carriage for the transducing-head and the erase-head are mounted and made to traverse the tape laterally for spiral track play-back and recording, and for erasing a previous record in advance of the making of a new recording.
FIG. 5 shows a longitudinal section of the drive-roller within which the motor and reducing gear are enclosed.
FIG. 6 shows a longitudinal section of the driven roller within which the amplifier is mounted.
FIG. 7 is an enlarged cross-sectional view on the plane 7—7 of FIG. 5.

A bushing 19*a* serves as a bearing which fits onto the hollow shaft 16*a* and allows the flange member 13*b* to turn freely on it. For the flange member 13*c* another bearing 19 is provided at the lower end of the drum 13 as shown in FIG. 5. This bearing is attached to the stationary frame of the reducing gear 17 and concentrically intervenes between two members which rotate at the same speed, namely, the slow-speed shaft 24 of the reducing gear 17, and the flange member 13*c* of the driving drum 13.

In FIGS. 5 and 7 there is shown, for example, a preferred form of resilient coupling between the slow-speed shaft 24 of the reducing gear 17 and the flange portion 13*c* of the driving drum. A key 25 fits into a slot in the end of the shaft 24. This key is also embedded in a soft rubber core 26 within an end portion 13*d* of the drum 13. Web members 27 are attached to the inner wall of the end portion 13*d*. The purpose of this resilient coupling is to mechanically insulate the driving drum from noise and vibration, if any, that may occur in the motor and reducing gear. A cap 28 may be screwed, or otherwise fitted, onto the end portion 13*d* to protect the parts described in this paragraph.

I have chosen to utilize the space between the two drums, and within the tape loop for mounting battery cells therein. These cells may include sections 29*a* (FIG. 9) of 1.5 volt rating for a first stage of amplification, section 29*b* for further amplification, and section 29*c* for energizing the motor 16. The power requirements for a recorder of this type, especially when transistorized, as it preferably is, do not call for using an external source. But such could, of course, be provided if desired. The battery sections can be secured to and between the side plates 1 and 2 in any suitable manner. The battery terminals are conveniently carried to a three-way switch 30 which is preferably mounted on the side plate 1, and has a key 31 for setting it to record, to listen, or to disconnect the battery.

In carrying out my invention I propose to adopt any suitable form of electric circuitry without restriction. It will be understood, therefore, that there is no need to disclose herein any particular circuit arrangement for operating my recorder. I do show, however, a conventional three-position switching device 30 (FIG. 9), the Off position being intermediate between a Record-position and a Play-Back position. The key 31 (FIG. 1) can be manipulated to move the contact-holding slide member 30*a* to the left to establish appropriate connections for recording. When the slide is moved to the right the play-back position is taken. In the intermediate position the movable contacts rest at central positions where they do not reach contacts on either side, and so all battery connections are "Off."

In the recording position connections are established from ground through the erase head winding 34, thence through a coupling capacitor 39 to an oscillator within the drum 14. In the recording position, also, the R/R-head 33 is connected through a resistor 35 of, say 50,000 ohms in value, to an output lead 36 from the last stage of amplification. The two-way audio element 32 is then used as a microphone and is coupled to the input circuit of the first stage of amplification through conductor 37. The three battery sections 29*a*, 29*b* and 29*c* are so connected by the switch 30 to appropriate circuitry in the amplifier and to the motor 16 as to activate the instrument for recording.

In the reading or play-back position of the switch 30 the following connections are established: The transducing head 33 is connected to the input side of the amplifier through conductor 37; the audio element 32 is directly connected to the output side of the amplifier through conductor 36; and the power leads are connected to the circuitry the same as for recording, except that there is no connection to the oscillator which is used for erasing. In the play-back position of switch 30, therefore, the erase-head 34 is incapable of erasing the previously recorded information.

Figures 8, 9:
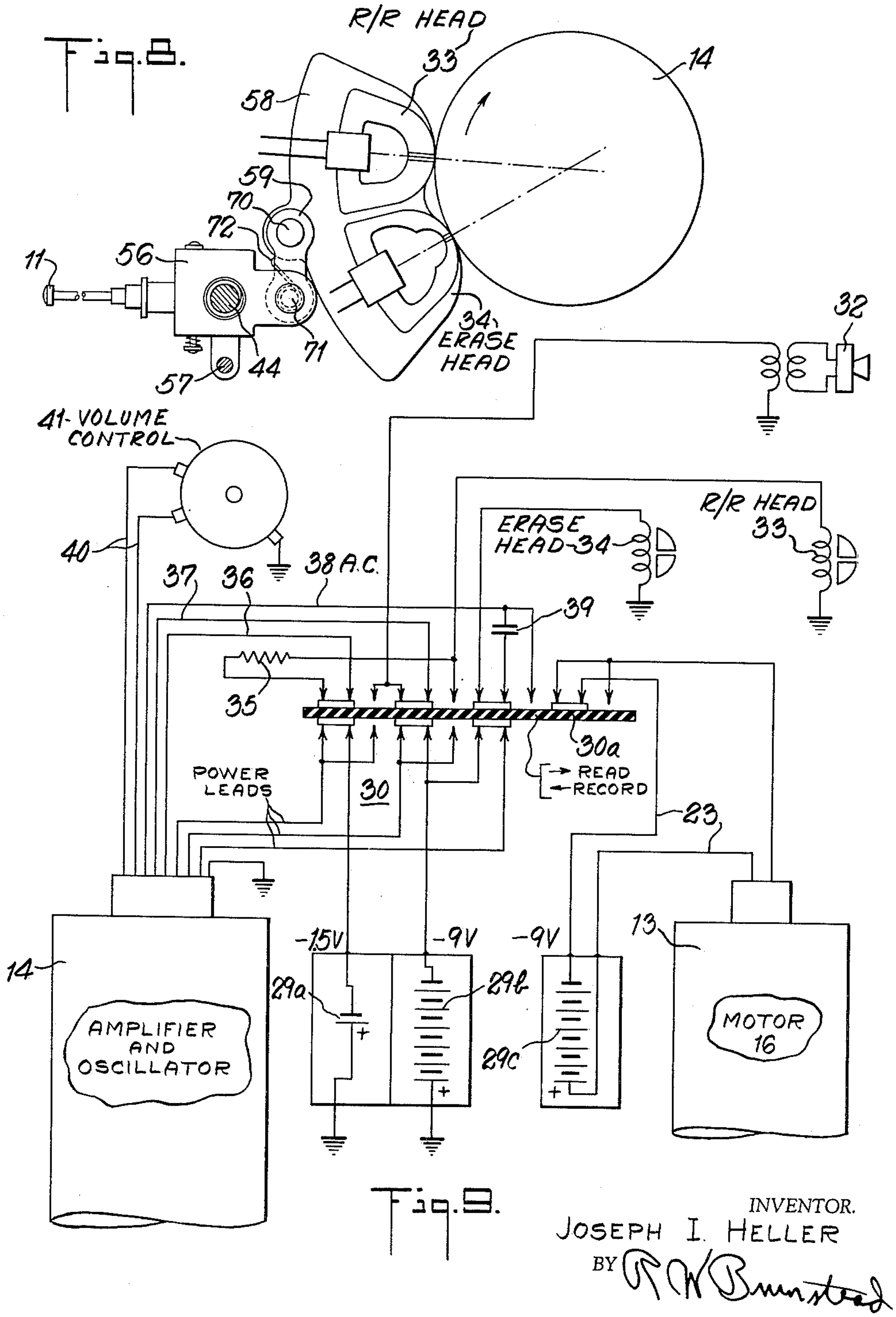

The driven drum 14, in which the amplifier is stationarily mounted, has an end-portion 14*a* (FIG. 6) which is journaled in the frame-plate 2. On the outer end of the portion 14*a* a pulley 42 is fitted tightly or keyed thereto. Pulley 42 is in transverse alignment with another pulley 43 mounted on a lead screw 44 which carries the transducing head and erase-head assembly. The drum 14 has a bushing 46 at the upper end as shown in FIG. 6. This enables it to rotate freely on the hollow shaft 47 by which the housing 48 for the amplifier is firmly secured to the side-plate 1. A multi-conductor cable 49 (FIG. 6) extends through the hole in the shaft 47 and interconnects the several portions of the amplifier with terminals on the switch 30 as shown in FIG. 9. Support for the amplifier housing 48 is also provided by means of a stud 50 on which the end portion 14*a* of the drum is made rotatable.

The lead-screw 44, on which a carriage 56 supporting the read/record and erase head assembly is arranged in a manner still to be described, is preferably mounted in a convenient manner, as shown in FIG. 4, so as to provide adjustability of the tracking of the heads with respect to the spiral track of a previous recording on the tape loop. No adjustment is required where a recording is to be made on fresh tape. But axial adjustment of the lead screw 44 is provided by the structure shown in FIG. 4. It is like this:

Assume that one wants to play back a record made on a tape loop that had been removed and stored, or had been recorded on a different instrument. The hood 6 is always removed for replacement of the tape loop. Before replacing the hood, the key 31 can be set for play-back, or to the reading position. The pivot stud 53 is threaded into the side plate 1. By screwing this stud in or out slightly, using the handle 54, it will be seen that the head assembly can be moved as a unit with the lead screw and thus made to track with the spiral recording on that tape without varying the angular position of the lead screw relative to the carriage. The adjustment is facilitated by listening to the output and getting the maximum volume without changing the volume control 41. The axial adjustment of the lead screw 44 is held in that adjustment by means of a spring 55 attached to a bracket 51 (FIGS. 1 and 4). This spring presses against the end of the lead screw 44 and maintains frictional engagement of the lead screw with a thrust bearing washer 52, where the latter serves to separate the pivot pin end of the lead screw from the bottom of the socket hole in the adjusting screw 53. The elements 53, 54 and 55 thus constitute self-locking adjusting means for axially displacing the lead screw 44 without rotating the same.

Figure 10:
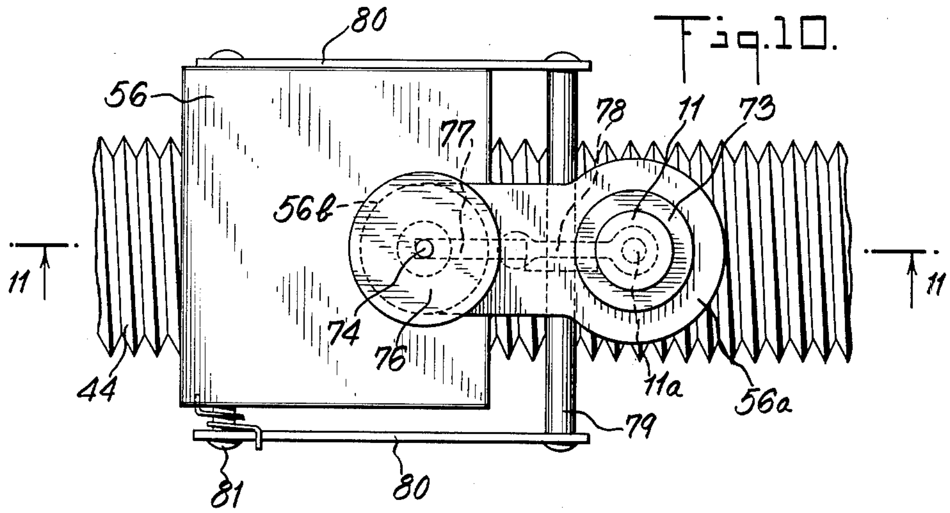
FIGURE 10 is a view and FIG. 11 is a cross-section showing details of a step-wise operable back spacing mechanism.
Figure 11:
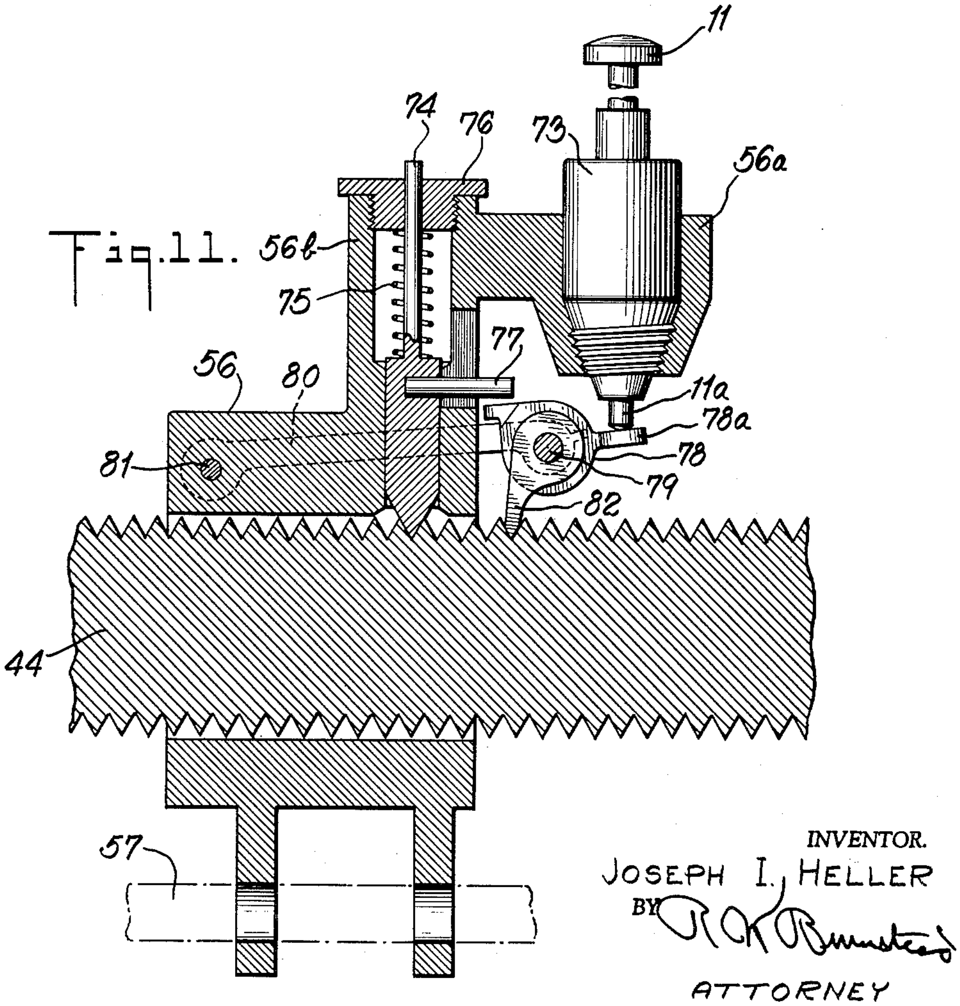

In FIGS. 8, 10, and 11 there is shown an assembly of parts which serve to move the electromagnetic heads so as to follow a spiral path on the tape loop 12, and also to be rendered adjustable like a back-spacing mechanism on a typewriter. A carriage 56 has two holes through it, these holes being arranged so as to be slideably supported on the lead screw 44 and on a leveling cross-bar 57. The R/R head 33 and the erase head 34 are mounted on a whipple-tree member 58 which is coupled to the carriage 56 by means of a link 59, together with pivot pins 70 and 71. A spring 72 is coiled around the pivot pin 71 and is anchored so as to urge the whipple-tree toward the axis of the drum 14. The swiveling of the whipple-tree on the pivot pin 70 allows equalization of the pressure of the two heads against the loop of recording tape 12. The applied pressure is directed toward the axis of the drum 14.

Back spacing mechanism is best shown in FIGS. 10 and 11. FIG. 10 is a view looking toward the carriage 56 and the lead-screw 44 through the slotted end of the casing, that is, the end wall 9 at the left side of FIG. 1. FIG. 11 is a cross-section of the carriage structure taken on a plane which is perpendicular to the viewing plane of FIG. 10.

The back-spacing key 11 acts as a plunger, being slideably held in place within a hole in a stud 73. This stud is screwed into or otherwise affixed to a projecting portion **56*a* on the carriage 56. Another carriage portion 56*b* is bored to receive a sliding tooth-like plunger 74 which is normally held in mesh with the thread of the lead screw 44 by means of a spring 75. This spring is compressed by means of a cap 76 that is screwed into the carriage portion 56*b*. A lift-pin 77 projects from tooth 74 and is engaged by a pivotally mounted cam member 78 which turns on an axle 79, the latter being so assembled with side-arms 80 as to constitute a trapeze arrangement which, again, is pivotally supported as by a rock-shaft 81 extending through a hole in the carriage 56**.

A portion **78*a* of the cam member 78 faces the inner end of the key post 11*a*. Key manipulation causes a lifting movement to be exerted by the cam 78 against the lift pin 77, thereby to free the tooth 74 from its tracking engagement with the thread of the lead screw 44. A dog 82 pivotally mounted on the axle 79 enables the tooth 74 to rise over the apex of no more than one thread of the lead screw 44 with each depression of the key 11**.

When finger pressure on key 11 is removed, then the tooth 74 drops into a back-spaced position on the lead screw 44. The dog 82 also rides over a thread apex and into the next groove so as to resume its normal distance of lag behind the tracking position of the tooth 74. This operation can be repeated at will, so as to find a wanted position of play-back or for making a corrective recording. It will be apparent that my back-spacing mechanism is of a type having step-by-step manipulation control, as distinguished from so-called "homing," or ratchet-release mechanisms. Moreover, this mechanism is capable of optional use to set the transducing head laterally to any desired extent while the tape feed is in motion, either forwardly or backwardly with respect to the spirally formed signal train on the endless tape.

In an embodiment of my novel tape recorder as already successfully operated, I have used the above described mechanism in a manner such as to maintain perfect tracking of the heads after their scanning position is shifted from one to another convolution of the spiral recording track. This is accomplished by virtue of the ratio 3.365:1 between the lead-screw revolutions and the revolutions of the drum 14, said ratio being the same as that which exists between the length of the tape loop and the circumference of the drum 14. Different designs of the recorder would, of course, require different calculations of the ratio. In other words, the turns of the lead-screw must be made such with respect to the circumference of the tape loop that the pitch of the lead-screw will correspond with the distance between adjacent convolutions of the sound track.

Figure 2:
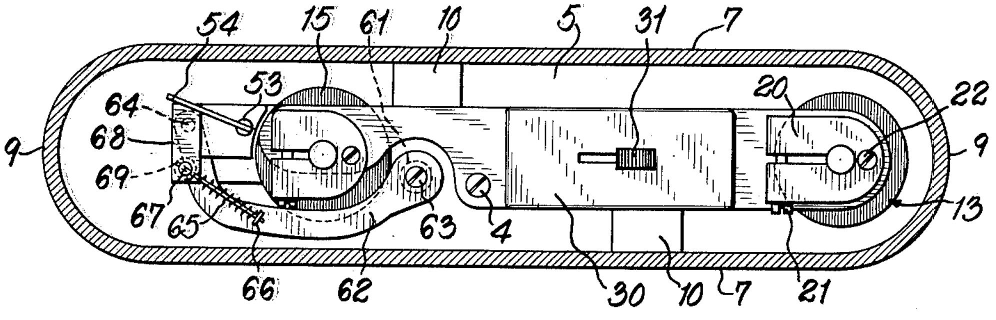
FIG. 2 is a sectional view at the plane 2—2 across FIG. 1.

The gate mechanism for removal and replacement of the tape loop is best shown in FIGS. 1, 2 and 3. It will be seen that I have provided a sort of trapeze structure for maintaining tension on the tape loop while in operation, and for loosening the same when it is to be removed. A cross-bar 61 is held by side arms 62 so as to be swung against the outer surface of the tape loop for exerting the desired tension. The screws 63 are used to clamp the side arms against shoulders on the cross-bar. The side-arms are swung on pivot-support screws 64, the latter being held by the side-plates 1 and 2.

In order to exert a suitable tension on the tape loop under operating conditions, the cross-bar 61 is pressed against the loop by means of springs 65. Each of these springs is compressed between a stud 67 and a washer at the elbow of a spring-straightening pin 69. One end of the straightening pin slips through a hole in the stud 67, and prevents bowing of its spring under compression. Beyond the elbow in each of these pins it is socketed in a hole through the associated side arm 62. This hole is so positioned with respect to the centers of pivoting of the arms 62 and the studs 67 as to cause a desired pressure engagement of the cross-arm 61 against the tape. Furthermore, the structure as shown has a desirable toggle action when the gate is opened, since the springs then hold the gate in the open position for removal of the tape.

It will be apparent to those skilled in the art that my pocket tape recorder has many novel features which might be mechanically modified in minor respects without departing from the spirit of the invention. Furthermore such modifications, if they fall within the scope of the claims, may readily occur to those skilled in the art in view of the teachings of this disclosure. The embodiment disclosed, therefore, is to be regarded as illustrative of the principles of the invention, which is not to be limited except as indicated by the scope of the appended claims.

I claim:

1. In a tape recorder; first and second stationary shafts arranged parallel to one another, a first hollow drum rotatably mounted on said first shaft, electric motor means stationarily mounted on said first shaft interiorly of said first drum, reducing gear means mounted within said first drum and operatively interconnecting said motor means to said first drum for rotating the same, a second hollow drum rotatably mounted on said second shaft, an endless belt of magnetic recording tape extending freely about said drums, a pressure bar adapted for engagement with a reach of said belt of tape intermediate said drums, a yoke mounted at one end and adjacent said second drum for pivotal movement about an axis parallel to the axis of rotation of said second drum and carrying said pressure bar at the other end, means connected with said yoke for biasing the same in such a direction as to cause said bar to engage and press against said reach of said belt of tape, to thereby tension the latter and cause it to transmit to said second drum the driving force exerted on said first drum by said electric motor means, a lead screw rotatably mounted adjacent and parallel to said second drum, a carriage mounted on said lead screw and provided with a follower element riding in the thread of said lead screw, whereby said carriage may be moved along said lead screw and along said second drum upon rotation of said lead screw, transmission means operatively connecting said second drum to said lead screw for rotating the latter jointly and in synchronism with said second drum, a read/record and erase head assembly mounted on said carriage and movable therewith along said second drum for selective spiral track recording, playing back and erasing of signals on said belt of tape, means for disengaging said follower element from said thread of said lead screw and for simultaneously back-spacing said carriage along said lead screw without rotation of the latter to bring said read/record and erase head assembly into alignment with a previously formed section of the spiral recording track, electronic oscillator and amplifier means stationarily mounted on said second shaft interiorly of said second drum for providing and controlling signals applied to and sensed by said read/record and erase head assembly, electric power source means positioned intermediate said drums and in the space between the elongated reaches of said belt of tape, and manually operable switch means operatively interconnecting said oscillator and amplifier means with said read/record and erase head assembly and said electric power source means, respectively, in accordance with the desired operation of said read/record and erase head assembly.

2. In a tape recorder having first and second hollow drums rotatable about spaced parallel axes, an endless belt of magnetic recording tape extending about said drums and constituting the motion-transmitting connection therebetween, and a read/record and erase head assembly mounted for movement over said belt of tape substantially transversely to the direction of movement of the latter; the improvement comprising an electric motor positioned interiorly of said first drum and operatively connected to the latter for rotating the same, said motor having an outer frame and field magnets secured to said frame, and means releasably engaging and gripping said frame of said motor to hold the same against rotation with said first drum and to adjust and fix the angular positions of said field magnets relative to the axis of rotation of said first drum and to the location of said read/record and erase head assembly so as to minimize possible interference by the magnetic lines of flux of said magnets with the magnetic flux of said read/record and erase head assembly.

3. In a tape recorder according to claim 2; said first drum being coated with mu-metal to provide a positive shielding action between said field magnets on the one hand and said belt of tape and said read/record and erase head assembly on the other.

4. In a tape recorder according to claim 2; reducing gearing stationarily positioned interiorly of said first drum and connected with said electric motor to be driven by the latter, said reducing gearing having an output shaft, and a resilient coupling interconnecting said shaft with said first drum, whereby the driving force of said motor is transmitted to said first drum without vibration of the latter and said belt of tape.

5. In a tape recorder according to claim 2; means arranged within the confines of said belt of tape and electrically connected to said read/record and erase head assembly for controlling the signals applied to and sensed by the latter, said signal controlling means comprising electronic amplifier and oscillator means stationarily positioned interiorly of said second drum.

6. In a tape recorder according to claim 5; said first and second drums being coated with mu-metal to provide a positive shielding of the signals generated by said read/record and erase head assembly and said electronic amplifier and oscillator means from any possibly signal-distorting effects of said field magnets.

7. In a tape recorder having first and second hollow drums rotatable about spaced parallel axes, and an endless belt of magnetic recording tape extending about said drums and constituting the motion-transmitting connection therebetween; the improvement comprising an electric motor positioned interiorly of said first drum and operatively connected to the latter for rotating the same, a read/record and erase head assembly mounted adjacent said second drum for movement therealong and over said belt of tape substantially transversely to the direction of movement of the latter for selective spiral track recording, playing back and erasing of signals on said belt of tape, said motor having an outer frame and field magnets secured to said frame, and means releasably engaging and gripping said frame of said motor to hold the same against rotation with said first drum and to adjust and fix the angular positions of said field magnets relative to the axis of rotation of said first drum and to the location of said read/record and erase head assembly so as to minimize possible interference by the magnetic lines of flux of said field magnets with the magnetic lines of flux of said read/record and erase head assembly.

8. In a tape recorder according to claim 7; means positioned within the confines of said belt of tape and electrically connected to said read/record and erase head assembly for controlling the signals applied to and sensed by the latter, said signal controlling means comprising electronic amplifier and oscillator means stationarily positioned interiorly of said second drum.

9. In a tape recorder according to claim 8; reducing gearing stationarily positioned interiorly of said first drum and connected with said electric motor to be driven by the latter, said reducing gearing having an output shaft, and a resilient coupling interconnecting said shaft with said first drum, whereby the driving force of said motor is transmitted to said first drum without vibration of the latter and said belt of tape.

10. In a tape recorder according to claim 8; said first and second drums being coated with mu-metal to provide a positive shielding of said read/record and erase head assembly and said electronic amplifier and oscillator means from any possibly signal-distorting effects of said field magnets.

11. In a tape recorder according to claim 8; D.C. power supply means positioned between said drum and intermediate said plane reaches of said belt of tape, a portion of said power supply means being electrically connected to said electronic amplifier and oscillator means and constituting a part of said signal controlling means, and another portion of said power supply means being electrically connected to said electric motor, and switch means controlling the connections of the respective portions of said power supply means to said electronic amplifier and oscillator means and to said electric motor.

12. In a tape recorder according to claim 8; a lead screw rotatably mounted adjacent said second drum and extending parallel thereto, a carriage upon which said read/record and erase head assembly is swivelly arranged, said carriage being mounted on said lead screw for movement axially of the latter, transmission means operatively interconnecting said second drum and said lead screw to effect rotation of the latter in synchronism with said second drum, clutch means supported by said carriage and normally engaging in and riding along the thread of said lead screw, whereby said carriage is moved forwardly and in one direction along said lead screw upon rotation of the latter with said second drum, the transmission ratio of said transmission means being predetermined to ensure that the pitch of the spiral recording track on said belt of tape is exactly equal to the pitch of the thread of said lead screw, and manipulating means disposed on said carriage and operable when actuated to disengage said clutch means from said lead screw and to simultaneously shift said carriage backwardly and in the other direction along said lead screw by at least one convolution of said thread so as to bring said read/record and erase head assembly into alignment with the corresponding preceding convolution of said spiral recording track on said belt of tape.

13. In a tape recorder according to claim 12; self-locking adjusting means operatively connected with said lead screw for enabling displacement of the same axially but without rotation, whereby the tape-engaging portions of said read/record and erase head assembly may be brought into precise alignment with a previously formed convolution of said spiral recording track independently of the operation of said second drum and said clutch means.

14. In a tape recorder according to claim 12; a pressure bar extending transversely to said belt of tape and adapted for engagement with one of said plane reaches of said belt of tape intermediate said drums, a yoke mounted at one end and adjacent said second drum for rocking movement about an axis parallel to the axis of rotation of said second drum and carrying said pressure bar at the other end, and means operatively connected with said yoke for biasing the same, when in a first over-center position, so as to cause said bar to engage and press against said one reach of said belt of tape to thereby tension the latter and ensure transmission to said second drum of the driving force exerted on said first drum by said electric motor, and for biasing said yoke, when in a second over-center position, so as to hold said bar away from said one reach of said belt of tape to thereby permit slackening of the latter for removal from said drums.

15. In a tape recorder; first and second hollow drums rotatable about spaced parallel axes and adapted to support an endless belt of magnetic recording tape, drive means operatively connected to said first drum, said drive means comprising an electric motor positioned interiorly of said first drum, and reducing gearing operatively interconnecting said motor and said first drum for rotating the latter, a lead screw rotatably mounted adjacent said second drum and extending parallel thereto, a read/record and erase head assembly mounted on said lead screw for movement therealong and along said second drum, electronic amplifier and oscillator means stationarily positioned interiorly of said second drum and electrically connected to said read/record and erase head assembly for controlling the signals applied to and sensed by the latter, said electric motor having an outer frame and field magnets secured to said frame, and means releasably engaging and gripping said frame of said motor to hold the same against rotation with said first drum and to adjust and fix the angular positions of said field magnets relative to the axis of rotation of said first drum so as to minimize possible interference by the magnetic lines of flux of said field magnets with the magnetic lines of flux of said read/record and erase head assembly and with said electronic amplifier and oscillator means.

16. In a tape recorder according to claim 15; said first and second drums being coated with mu-metal to provide shields around said electric motor and said field magnets thereof and around said electronic amplifier and oscillator means.

17. In a tape recorder according to claim 1; said first shaft being rotatable about its axis, said electric motor means being equipped with an outer frame and field magnets secured to said frame, said frame being affixed to said first shaft, and means releasably engaging and gripping said first shaft to hold the same and therewith said frame of said motor means against rotation with said first drum and to adjust and fix the angular positions of said field magnets relative to the axis of rotation of said first drum and to the location of said read/record and erase head assembly so as to minimize possible interference by the magnetic lines of flux of said field magnets with the magnetic lines of flux of said read/record and erase head assembly and with said electronic oscillator and amplifier means.

18. In a tape recorder according to claim 17; said first and second drums being coated with mu-metal to provide a positive shielding of said read/record and erase head assembly and said electronic oscillator and amplifier means from any possibly signal-distorting effects of said field magnets.

References Cited in the file of this patent

UNITED STATES PATENTS

| | | |
|---|---|---|
| 1,257,660 | Willis | Feb. 26, 1918 |
| 2,303,840 | James | Dec. 1, 1942 |
| 2,683,038 | Saliba et al. | July 6, 1954 |
| 2,694,192 | Dean et al. | Nov. 9, 1954 |
| 2,706,118 | Camras | Apr. 12, 1955 |
| 2,756,057 | Parkinson | July 24, 1956 |
| 2,773,120 | Masterson | Dec. 4, 1956 |
| 2,795,135 | Kremser | June 11, 1957 |
| 2,951,127 | Pierson | Aug. 30, 1960 |

UNITED STATES PATENT OFFICE

CERTIFICATE OF CORRECTION

Patent No. 3,050,595 August 21, 1962

Joseph I. Heller

It is hereby certified that error appears in the above numbered patent requiring correction and that the said Letters Patent should read as corrected below.

Column 8, line 46, for "drum" read -- drums --.

Signed and sealed this 18th day of December 1962.

SEAL)
Attest:

ERNEST W. SWIDER
Attesting Officer

DAVID L. LADD
Commissioner of Patents